US006033634A

United States Patent [19]

Koga

[11] Patent Number: 6,033,634

[45] Date of Patent: Mar. 7, 2000

[54] PLATE TYPE SHIFT REFORMER AND SHIFT CONVERTER WITH HYDROGEN PERMEATE CHAMBER

[75] Inventor: Minoru Koga, Kawasaki, Japan

[73] Assignee: Ishikawajima-Harima Heavy Industries Co., Ltd., Japan

[21] Appl. No.: 09/046,576

[22] Filed: Mar. 24, 1998

[30] Foreign Application Priority Data

Mar. 25, 1997 [JP] Japan .................................... 9-088709

[51] Int. Cl.[7] .................................. B01J 8/04; F28D 7/00

[52] U.S. Cl. ........................... 422/198; 422/191; 422/200

[58] Field of Search .................................... 422/177, 191, 422/198, 200; 48/127.7, 198.7; 252/373; 429/17, 19

[56] References Cited

U.S. PATENT DOCUMENTS

| | | | |
|---|---|---|---|
| 3,338,681 | 8/1967 | Kordesch | 422/211 |
| 4,331,574 | 5/1982 | Kordesch et al. | 525/530 |
| 4,593,754 | 6/1986 | Holl | 165/109.1 |
| 4,713,234 | 12/1987 | Weirich et al. | 423/648.1 |
| 4,981,676 | 1/1991 | Minet et al. | 423/652 |
| 5,015,444 | 5/1991 | Koga et al. | 422/195 |
| 5,032,365 | 7/1991 | Atsushi et al. | 422/197 |
| 5,139,541 | 8/1992 | Edlund | 95/56 |
| 5,180,561 | 1/1993 | Morishima et al. | 422/191 |
| 5,270,127 | 12/1993 | Koga et al. | 429/17 |
| 5,853,674 | 12/1998 | Lesieur | 422/173 |
| 5,858,314 | 1/1999 | Hsu et al. | 422/211 |

FOREIGN PATENT DOCUMENTS

| | | |
|---|---|---|
| 0 529 329 | 3/1993 | European Pat. Off. . |
| 0 615 949 | 9/1994 | European Pat. Off. . |
| 1 417 757 | 2/1966 | France . |
| 06345404 | 12/1994 | Japan . |

*Primary Examiner*—Marian C. Knode
*Assistant Examiner*—Alexa A. Doroshenk
*Attorney, Agent, or Firm*—Criffin, Butler Whisenhunt & Szipl, LLP

[57] ABSTRACT

A hydrogen manufacturing apparatus is equipped with a plate type high-temperature shift converter (II) which has a shift reaction chamber (7) which is filled with a high-temperature shift catalyst (8) and into which a reformed gas is introduced, a cooling chamber (9) which is filled with a filler (10) for promoting heat transfer and into which a cooling gas is introduced, and a partition (6) for separating the shift reaction chamber and the cooling chamber. The shift reaction chamber has a hydrogen gas chamber (11) separated by a plate type partition (12), and the partition is composed of a porous plate (14) and a hydrogen permeable film (13) which is coated or plated thereon and which lets only hydrogen gas permeate therethrough. Thus only hydrogen generated in the shift reaction chamber permeates the hydrogen permeable film into the hydrogen gas chamber. In another embodiment, the apparatus has a plate type reformer (I) having a reforming chamber (1) which is filled with a reformed catalyst (2) and into which natural gas is introduced to reform it, a heating chamber (3) which is filled with a filler (4) for promoting heat transfer and into which a combustion gas is introduced, and a partition (5) which separates said reforming chamber and said heating chamber. The reforming chamber has a hydrogen gas chamber (11) separated by a plate type partition (12); and the partition is composed of a porous plate (14) and a hydrogen permeable film (13).

2 Claims, 4 Drawing Sheets

PLATE TYPE SHIFT REFORMER AND SHIFT CONVERTER WITH HYDROGEN PERMEATE CHAMBER

BACKGROUND OF THE INVENTION

1. Field of the Invention

The present invention relates to a hydrogen manufacturing apparatus for manufacturing high-purity hydrogen by reformed natural gas, methanol, or other hydrocarbon.

2. Related Background Art

The pressure swing adsorption (PSA) has been an industrially predominant prior art for refining hydrogen with high purity from a hydrogen-rich gas which has been obtained by steam-reformed natural gas. According to PSA, the pressure of a hydrogen-rich gas which has been introduced in an absorption tower or pressure vessel is changed to repeat the adsorption and desorption to and from an adsorbent so as to separate and refine a target gas. As the adsorbent, for example, a carbon molecular sieve, synthetic zeolite, or the like is used according to the gas to be separated; the target gas is separated by making use of the fact that the properties of the gases adsorbed to those adsorbents are different. The PSA is characterized in that the adsorption per unit adsorbent increases as the pressure is increased, while it decreases as the pressure is decreased.

To manufacture hydrogen using the aforesaid PSA, however, it is required to install three or four absorption towers or pressure vessels when using, for example, an installation capable of producing hydrogen at 600 Nm3/hr. In addition, a dispensing tank must be installed. Hence, the entire arrangement has inevitably become large, preventing compact equipment for producing hydrogen at lower cost from being achieved. For this reason, it has been difficult to install a hydrogen manufacturing apparatus for a system using hydrogen as the fuel (e.g. a motorcar) in a limited space.

SUMMARY OF THE INVENTION

The present invention has been made with a view toward solving the problem described above. It is an object of the present invention to provide a compact hydrogen manufacturing apparatus capable of producing high-purity hydrogen.

To this end, according to one aspect of the present invention, there is provided a hydrogen manufacturing apparatus equipped with: a plate type high-temperature shift converter (II) having a shift reaction chamber (7) which is filled with a high-temperature shift catalyst (8) and into which a reformed gas flows, a cooling chamber (9) which is filled with a filler (10) for promoting heat transfer and into which a cooling gas flows, and a partition (6) for separating the shift reaction chamber and the cooling chamber; wherein the shift reaction chamber has a hydrogen gas chamber (11) separated by a plate type partition (12); the partition is composed of a porous plate (14) and a hydrogen permeable film (13) which is coated or plated on the porous plate and which lets only hydrogen gas permeate therethrough. Thus, only the hydrogen, which has been generated by the shift reaction of the reformed gas in the shift reaction chamber, is allowed to permeate the hydrogen permeable film to flow out into the hydrogen gas chamber. This structure is used in either a single layer or multiple layers.

According to another aspect of the invention, there is provided a hydrogen manufacturing apparatus equipped with: a plate type high-temperature shift converter (II) having a shift reaction chamber (7) which is filled with a high-temperature shift catalyst (8) and into which a reformed gas flows, a cooling chamber (9) which is filled with a filler (10) for promoting heat transfer and into which a cooling gas flows, and a partition (6) for separating the shift reaction chamber and the cooling chamber; wherein the plate type high-temperature shift converter (II) is provided with a plurality of partitions (6), shift reaction chambers (7), cooling chambers (9), and hydrogen gas chambers (11); two adjoining shift reaction chambers are disposed such that they are opposed to each other with the hydrogen gas chamber (11), which is separated by a plate type partition (12), placed therebetween; the partition is composed of a porous plate (14) and a hydrogen permeable film (13) which is coated or plated on the porous plate to let only hydrogen gas permeate therethrough. Thus, only the hydrogen, which has been generated by the shift reaction of the reformed gas in the two adjoining shift reaction chambers, is allowed to permeate the hydrogen permeable film and to flow out into a single hydrogen gas chamber.

When the reformed gas is introduced into the shift reaction chambers, the shift reaction is carried out by exothermic reaction, and only hydrogen passes through the hydrogen permeable film from the shift reaction chambers, thus separating hydrogen.

A palladium film can be suitably used for the hydrogen permeable film for the following reason: the operating temperature, about 300 to about 500 degrees Celsius, of the palladium film coincides with the working temperature of the high-temperature shift converter; therefore, the high-temperature shift converter can be operated at its normal working temperature to manufacture hydrogen by using the palladium film. Hence, the palladium film will not be deteriorated, and moreover, the working temperature of a reformer can be determined independently of the operating temperature of the palladium film.

Further, installing the hydrogen permeable film in the reforming chamber of the reformer makes it possible to immediately pass the hydrogen, which has been generated by reformed natural gas, through the hydrogen permeable film to produce pure hydrogen.

The above and other objects and features of the present invention will be apparent from a reading of the following description of the disclosure found in the accompanying drawings.

DETAILED DESCRIPTION OF THE PREFERRED EMBODIMENTS

The embodiments of the present invention will now be described with reference to the accompanying drawings.

Figure 1:
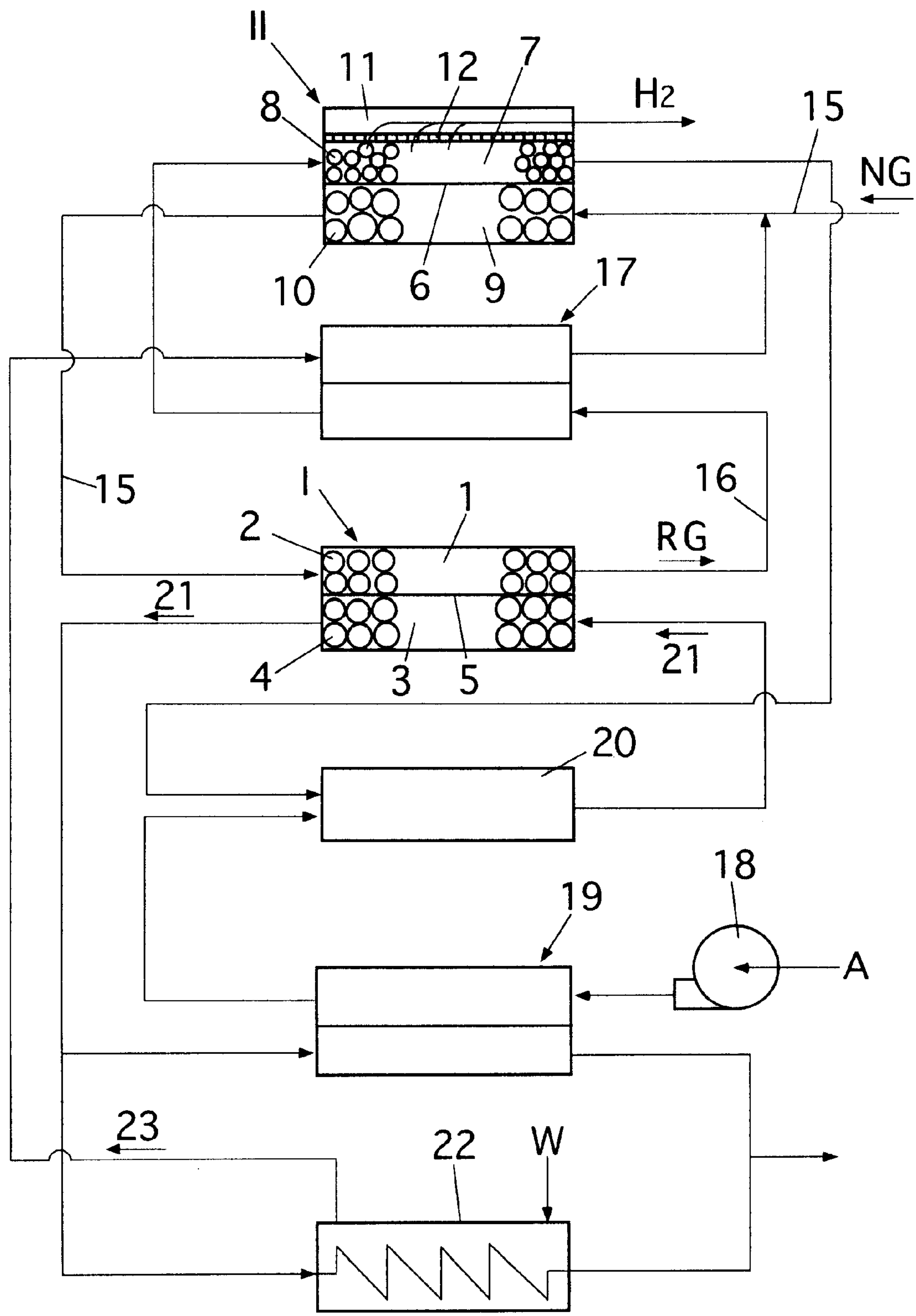
FIG. 1 is a general configuration view illustrating a first embodiment of the present invention.
Figure 2:
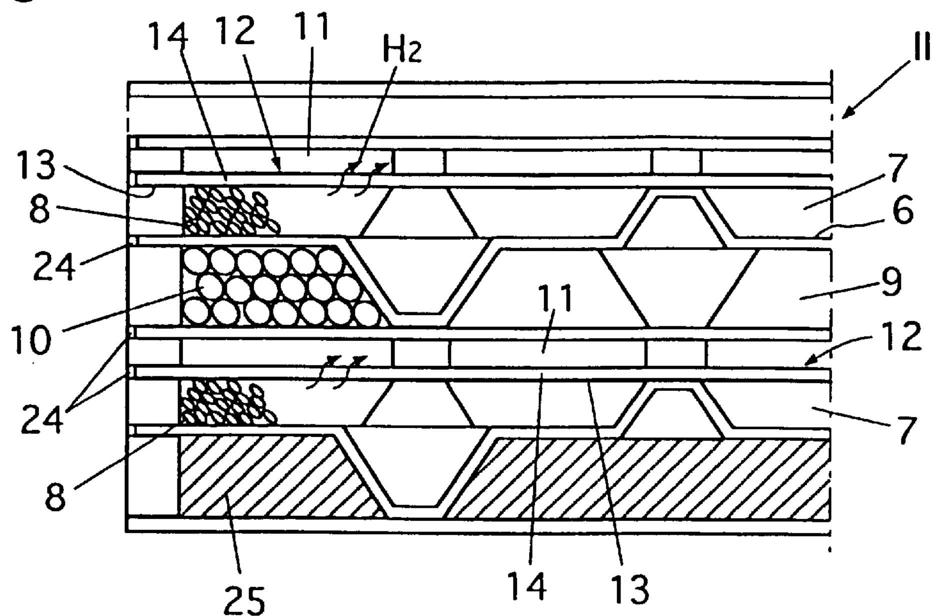
FIG. 2 is an enlarged sectional view of a high-temperature shift converter shown in FIG. 1.

FIG. 1 and FIG. 2 show a first embodiment of the invention. The hydrogen-rich gas which has been obtained by steam-reformed natural gas NG by a reformer I is subjected to the shift reaction carried out by a high-temperature shift converter II, then only the hydrogen is separated.

As illustrated in FIG. 1, the hydrogen manufacturing apparatus in accordance with the invention is equipped with the plate type reformer I and the plate type high-temperature shift converter II. The plate type reformer I is composed of a reforming chamber 1 and a heating chamber 3 layered with a metallic partition 5 provided therebetween. The reforming chamber 1 is filled with a reforming catalyst 2, and natural gas flows into the reforming chamber 1. The heating chamber 3 is filled with alumina balls serving as fillers 4 for promoting heat transfer; a combustion gas flows into the heating chamber 3.

As detailedly shown in FIG. 2, the plate type high-temperature shift converter II has a cooling chamber 9, shift reaction chambers 7, and a plate type hydrogen gas chamber 11 which are layered with a metallic partition 6 placed therebetween. The metallic partition 6 has been subjected to press machining so that their front and back surfaces have alternate projections and recessions. One side of the cooling chamber 9 is filled with alumina balls serving as the fillers for promoting heat transfer. The shift reaction chambers 7 have high-temperature shift catalysts 8 filled on the opposite side from the partition 6 to carry out the shift reaction. The plate type hydrogen gas chamber 11 has channels formed by projections and recessions.

Figure 3:
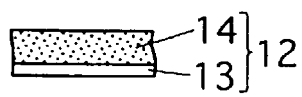
FIG. 3 is an enlarged sectional view of a partition provided with a palladium film.

Another partition 12 is provided between the hydrogen gas chamber 11 and the shift reaction chamber 7. As shown in FIG. 3, the partition 12 is composed of a porous plate 14 and a palladium film 13 which is a hydrogen permeable film selectively allowing only hydrogen to pass therethrough and which is coated or plated on one surface of the porous plate 14. The palladium film 13 is deposited such that it is located on the side of the shift reaction chamber 7. The operating temperature of the palladium film 13 is set to about 300 to about 500 degrees Celsius because the palladium film 13 is embrittled at a temperature below 300 degrees Celsius under the presence of hydrogen.

In FIG. 1, natural gas NG is introduced via a natural gas line 15 into the cooling chamber 9 of the high-temperature shift converter II; it is used for cooling at the time of the shift reaction, which is an exothermic reaction. The natural gas NG which has left the cooling chamber 9 is led into the reforming chamber 1 of the reformer I via the natural gas line 15. Hydrogen-rich gas RG which has been reformed in the reforming chamber 1 passes through a reformed gas line 16 into a heat exchanger 17 where the temperature thereof is adjusted to about 300 to about 500 degrees Celsius, which is the working temperature of the high-temperature shift converter II, before it is introduced into the shift reaction chamber 7 of the high-temperature shift converter II. Then, only the hydrogen generated by the shift reaction in the shift reaction chamber 7 flows into the hydrogen gas chamber 11 through the porous partition 12 with the palladium film 13 attached to one surface thereof, thus producing high-purity hydrogen.

Air A is led from a blower 18 to an air preheater 19 where it is preheated, then it is further introduced into a combustor where the remaining reformed gas RG, from which hydrogen has been separated in the shift reaction chamber 7, is burnt; and resulting combustion gas 21 is supplied to the heating chamber 3 of the reformer I which performs the reforming operation by endothermic action. The combustion gas 21 which has left the heating chamber 3 of the reformer I is led to an air preheater 19 and a steam generator 22, then it is released into the open air. Water W is turned into steam 23 in a steam generator 22; it is supplied to the natural gas line 15 via the heat exchanger 17 and mixed with the natural gas NG.

As shown in FIG. 2, the boundaries around the shift reaction chambers 7, the cooling chamber 9, and the hydrogen gas chamber 11 of the high-temperature shift converter II are sealed with sealing members 24 to prevent gas leakage. Reference numeral denotes an insulating material filled in the outermost portion.

As described above, the natural gas NG is introduced into the cooling chamber 9 of the high-temperature shift converter II through the natural gas line 15 to cool the high-temperature shift reaction gas resulting from the exothermic reaction, then it is supplied to the reforming chamber 1 of the reformer I. In the reforming chamber 1, the heat of the combustion gas 21 having a high temperature, e.g. approximately 750 degrees Celsius, which has been introduced into the heating room 3, is absorbed through a partition 5 so that the following reaction takes place:

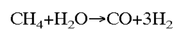

$$CH_4+H_2O \rightarrow CO+3H_2$$

Thus, carbon monoxide and hydrogen are generated. The temperature of the reformed gas RG is approximately 700 degrees Celsius, while the working temperature of the high-temperature shift converter II ranges about 300 to about 500 degrees Celsius; hence, the reformed gas RG is cooled down to about 500 degrees Celsius by the heat exchanger 17. As previously mentioned, the operating temperature of the palladium film 13 serving as the hydrogen permeable film ranges about 300 to about 500 degrees Celsius; however, since it coincides with the working temperature of the high-temperature shift converter II, the high-temperat ure shift converter II can be operated at its own working temperature and the palladium film 13 is not deteriorated. In the shift reaction chamber 7, the reaction given below takes place due to the exothermic reaction while the cooling by the natural gas NG, which flows in the cooling chamber 9, is carried out:

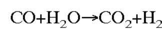

$$CO+H_2O \rightarrow CO_2+H_2$$

Thus, the carbon monoxide is decreased, and carbon dioxide and hydrogen are obtained. At the same time, only hydrogen is separated by making use of the palladium film 13 on the surface of the partition 12, and high-purity hydrogen H2 passes through the porous plate 14 and flows out into the hydrogen gas chamber.

The remaining reformed gas from which hydrogen has been separated in the shift reaction chamber 7 of the high-temperature shift converter II contains H2 and CO2, so that it is burnt in the combustor to use it as the heat source for the reformer I.

Only hydrogen, which has been generated by the shift reaction in the shift reaction chamber 7 mentioned above, is separated by permeation through the palladium film 13 for the following reasons:

(1) Hydrogen molecules are adsorbed to the palladium film.

(2) The adsorbed hydrogen molecules dissociate to hydrogen atoms.

(3) The hydrogen atoms are ionized and separate into protons and electrons.

(4) The protons diffuse from the front surface to the back surface of the palladium film.

(5) The protons which have reached the back surface reunite with electrons on the surface of the palladium film and turn into hydrogen atoms.

(6) The hydrogen atoms unite to form hydrogen molecules.

(7) The hydrogen molecules come off the palladium film.

Thus, only the hydrogen which can be in the proton state passes through the palladium film 13, while those impurities which cannot be in the proton state do not pass through the palladium film 13. This is the reason why hydrogen with high purity can be refined.

Hydrogen permeability rate Q of the palladium film 13 is represented by the formula given below:

$$Q=At^{m}\Delta P^{n}e^{-B/RT}$$

where A: Constant of palladium alloy t: Thickness of palladium film m: Constant (about 1)

ΔP: Differential pressure of palladium film n: 0.5~0.8

B: Activating energy

R: Gas constant

T: Temperature

According to the present invention, in the shift reaction chamber 7 of the high-temperature shift converter II, the hydrogen chambers 11 are stacked via the partitions 12 composed of the porous plates 14 having the palladium films 13 coated or plated thereon; the shift reaction is carried out in the working temperature range which coincides with the operating temperature range, namely, about 300 to about 500 degrees Celsius, of the palladium film 13 so as to permit only hydrogen to permeate the partitions 12 into the hydrogen gas chambers 11. Hence, in the reformer I, the reforming can be achieved at its own working temperature, namely, 700 degrees Celsius or higher. The palladium films 13 formed on the surfaces of the plate type partitions 12 provide a larger permeation area in comparison with tubular type partitions.

Figure 4:
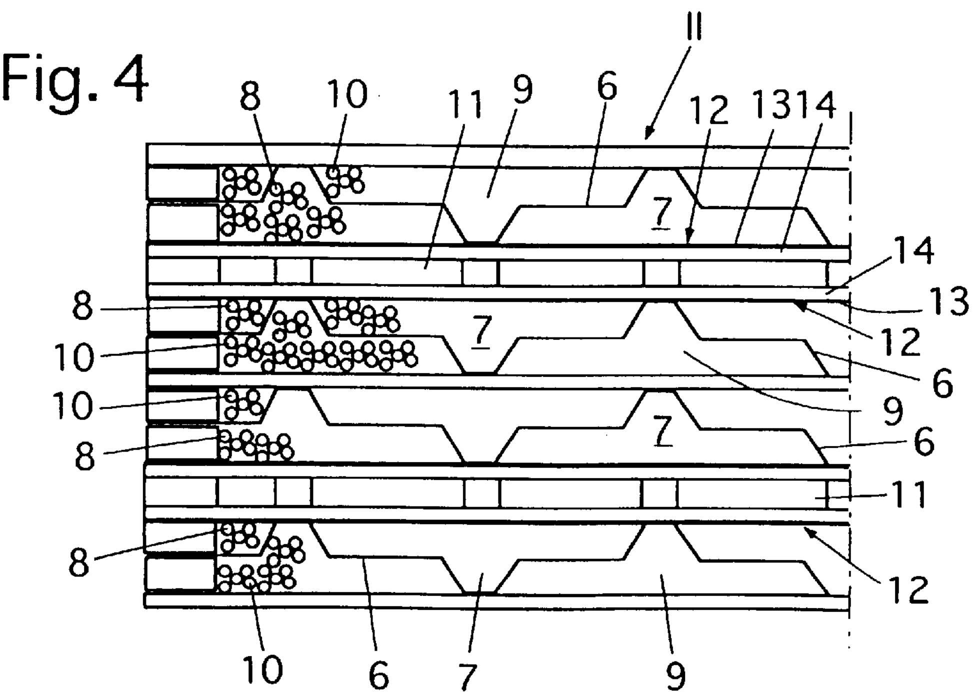
FIG. 4 is an enlarged sectional view illustrating a second embodiment of the high-temperature shift converter.

FIG. 4 is an enlarged configuration diagram like the one shown in FIG. 2; it illustrates a second embodiment of the high-temperature shift converter II. In the embodiment shown in FIG. 2, the cooling chamber 9, the shift reaction chambers 7, and the hydrogen gas chambers 11 are stacked in the same direction. In the high-temperature shift converter II shown in FIG. 4, the shift reaction chamber 7 and the cooling chamber 9 are vertically stacked such that they are opposed to each other with one hydrogen gas chamber 11 placed therebetween. Further, the partition 12 is provided between two adjoining shift reaction chambers 7 and the single hydrogen gas chamber 11 therebetween. The partition 12 is composed of the porous plate 14 with the palladium film 13 coated or plated thereon so that the palladium film 13 faces the shift reaction chamber 7.

The second embodiment makes it possible to use one hydrogen gas chamber 11 to pass the hydrogen, which has been obtained by the shift reaction in two shift reaction chambers 7, through the palladium film 13 and then the porous plate 14 into the common hydrogen gas chamber 11, thus permitting high-purity hydrogen to be produced.

Figure 5:
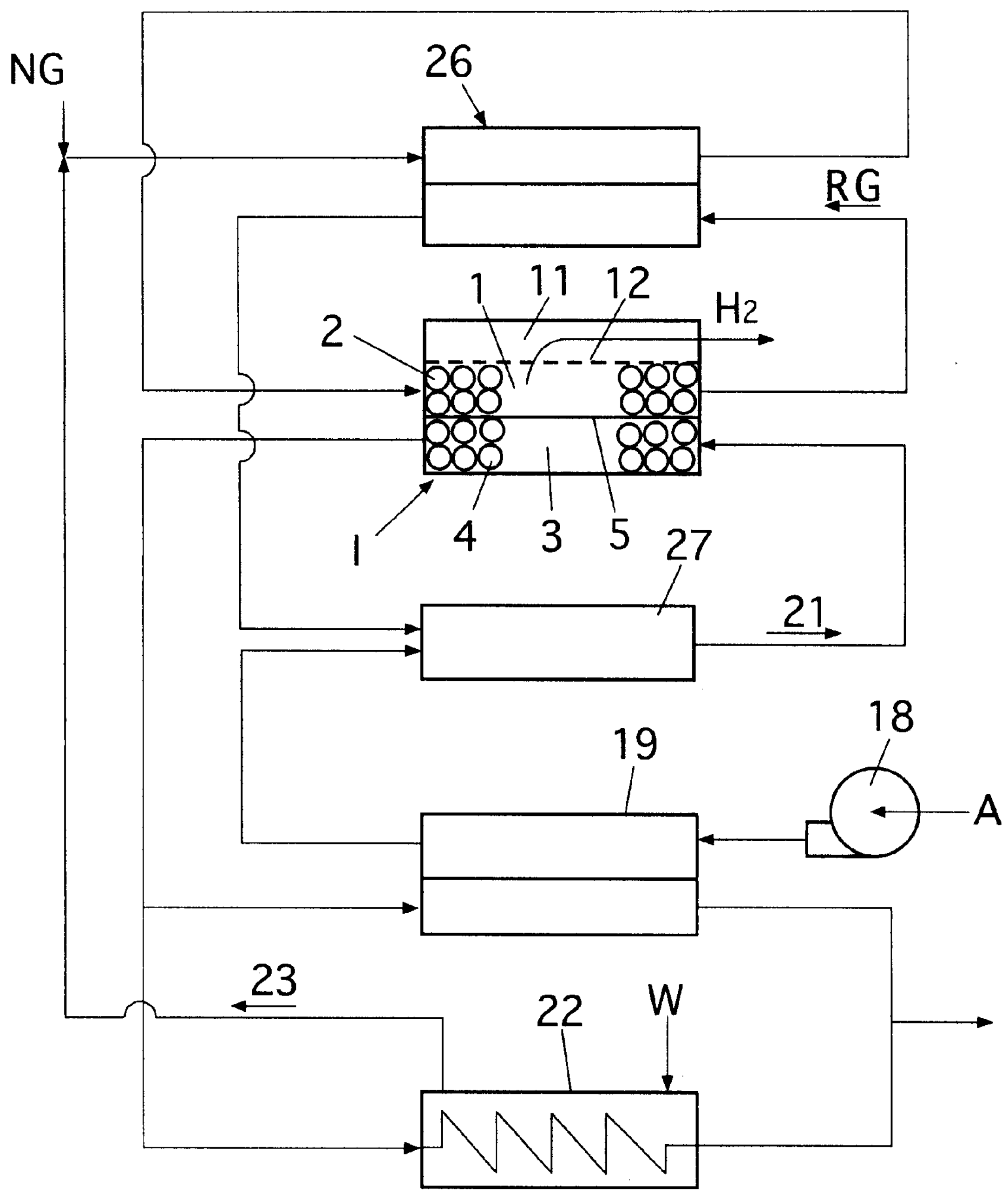
FIG. 5 is a general configuration view illustrating a third embodiment of the present invention.
Figure 6:
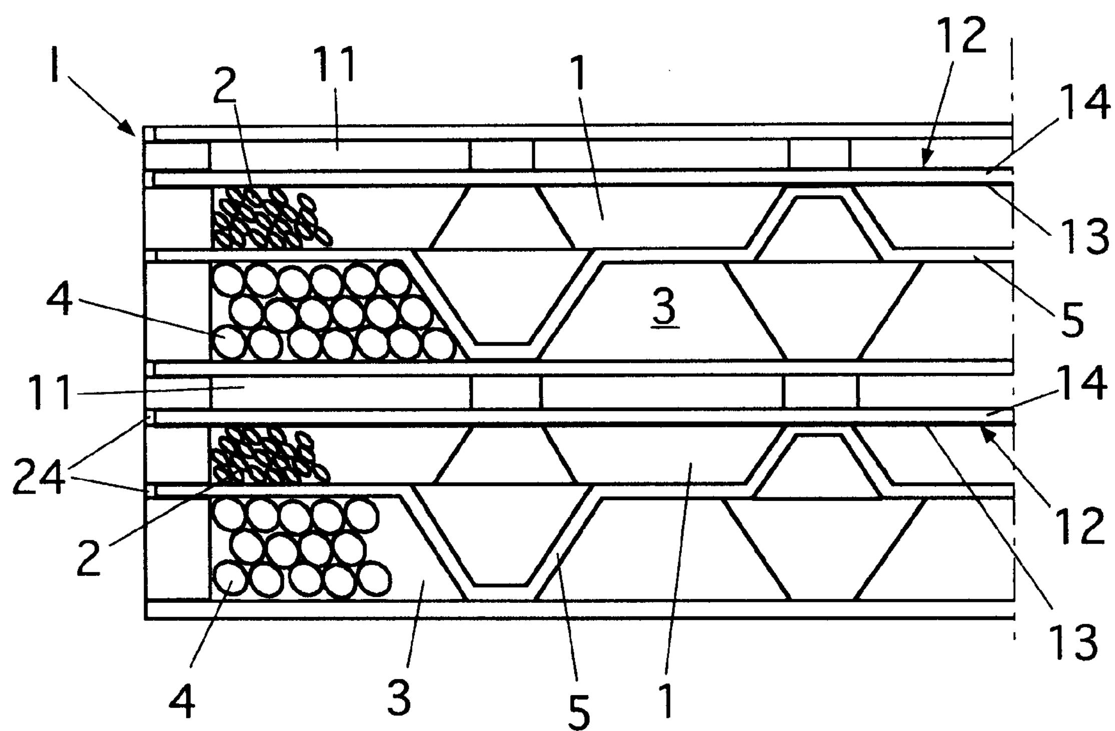
FIG. 6 is an enlarged sectional view of a reformer shown in FIG. 5.

FIG. 5 and FIG. 6 illustrate a third embodiment in accordance with the present invention. In FIG. 5 and FIG. 6, like components as those shown in FIG. 1 and FIG. 2 are assigned like reference numerals.

The reformer I of the third embodiment is a plate type reformer wherein the hydrogen gas chambers 11 are stacked via the partitions 12 in the reforming chambers 1. The partitions 12 are composed of the porous plates 14 with the palladium films 13 coated or plated thereon, so that the hydrogen generated in the reformer I may be immediately permeated through the palladium films 13 for separation.

As shown in FIG. 6, the reformer I, which is the plate type reformer, is constituted by the reforming chamber 1 and the heating chamber 3 with the partition 5 provided therebetween, the partition 5 being a metal plate which has been subjected to press machining to form projections and recessions on both front and back surfaces thereof. The reforming chamber 1 is filled with the reforming catalyst 2, while the heating chamber 3 is filled with alumina balls as the fillers 4 for promoting heat transfer.

Further in the reformer I, the plate type hydrogen chambers 11 are stacked on the side of the reforming chambers 1 with the partitions 12 provided therebetween. The heating chambers 3, the reforming chambers 1, and the hydrogen gas chambers 11 are stacked in multiple layers to make up the reformer I. The plate type hydrogen gas chambers 11 have hydrogen channels formed by projections and recessions. The partitions 12 are composed of the porous plates 14 with the palladium films 13 coated or plated on the surfaces thereof.

In FIG. 5, the natural gas NG is preheated together with the steam 23 by the heat exchanger 26 before it is supplied to the reforming chambers 1. Next, the reformed gas RG emitted from the reforming chamber 1 is subjets the natural gas NG to preheating at the heat exchanger 26, then the reformed gas is burnt with air. A in the combustor 27, and the combustion gas 21 is introduced into the heating chamber 3 of the reformer I. Further, the combustion gas which has left the heating chamber 3 is led through the air preheater 19 and the steam generator 22, then it is released into the open air.

According to the third embodiment, the natural gas NG is preheated together with the steam 23 by the heat exchanger 26 to 350 degrees Celsius or higher which is a suitable temperature for operating the palladium films 13 serving as the hydrogen permeable films before it is supplied to the reforming chambers 1 of the reformer I. Thus, in the reforming chambers 1, the heat of the combustion gas 21, which has been led into the heating chamber 3, is absorbed via the partition 5, so that the reaction shown below takes place to accomplish the reforming:

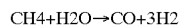

In this case, the reformer I is operated in the operating temperature range of the palladium film 13. The reformed hydrogen has a high partial pressure; hence, it permeates the palladium films 13 and passes through the partitions 12, which are composed of the porous plates 14, into the hydrogen gas chambers 11. The hydrogen thus generated in the reforming chambers 1 immediately flows out from the reforming chambers 1 into the hydrogen gas chambers 11, enabling a predetermined methane reforming rate to be obtained at a lower temperature than the equilibrium temperature in the reforming reaction.

The remaining reformed gas RG from which hydrogen has been separated in the reforming chambers 1 is exhausted at about 500 degrees Celsius; since it contains $H_2$ and $CO_2$, it is burnt in the combustor 27 and introduced into the heating chambers 3 of the reformer I to provide the heat source for the reformer I.

The approximate working pressure of the hydrogen separating mechanism employing the palladium films 13 is determined from the following conditions:

Pi: Total pressure of reformed gas (atm)

Po: Total pressure on permeation end a: Hydrogen molar fraction of reformed gas b: Hydrogen molar fraction on permeation end e: Hydrogen destruction efficiency In the case of the steam-reformed gas from natural gas, the hydrogen molar fraction at the exit of the high-temperature shift converter II is approximately 0.64. Assuming that the total pressure on the permeation end is 1 atm (pure hydrogen) and the hydrogen separating efficiency is 0.7, the total pressure Pi of the reformed gas will be 5.21 atm.

In order to improve the hydrogen permeating rate, the palladium film 13 must have a thickness of a few tens of microns. The differential pressure acting on the palladium film 13 is considerably enhanced by the porous plate 14.

The hydrogen separating efficiency is set to 70% because the steam reforming of the natural gas requires energy, and the hydrogen and CO gas which have not been separated by the palladium films are used as the heat source for the reformer I.

In the embodiments described above, a purge gas can be poured into the hydrogen gas chambers 11; therefore, the total pressure Pi of the reformed gas can be decreased by supplying the purge gas into the hydrogen gas chambers 11 to lower the partial pressure of the hydrogen on the permeation end, with the hydrogen molar fraction of the reformed gas and the hydrogen separating efficiency maintained at constant levels.

Thus, according to the hydrogen manufacturing apparatus in accordance with the present invention, in the plate type high-temperature shift converter II for subjecting the gas, which has been reformed by the reformer, to shift reaction, the shift reaction chambers are stacked with the hydrogen gas chamber located therebetween via the plate type partition composed of the porous plate provided with a metallic film such as the palladium film, which permits only hydrogen to pass therethrough, coated or plated thereon. The hydrogen which has been obtained by subjecting the gas, which has been reformed by the reformer, to the shift reaction in the shift reaction chambers of the high-temperature shift converter, is passed through the hydrogen permeable films and it is led out into the hydrogen gas chambers, thus producing hydrogen. In another configuration, the hydrogen gas chambers are disposed via the partitions in the reforming chamber of the plate type reformer; the hydrogen which has been generated in the reforming chamber is immediately sent out to the hydrogen gas chambers via the hydrogen permeable films to produce hydrogen. The configurations described above provide the following advantages:

(1) Pure hydrogen can be easily manufactured by a plate type high-temperature shift converter or reformer. In addition, the high-temperature shift converter or reformer can be installed as a hydrogen manufacturing apparatus in a limited installation space; this is particularly advantageous for using it as the fuel for an automotive solid polymeric fuel cell.

(2) The use of the plate type partition composed of a porous plate having a hydrogen permeable film attached thereto provides a larger hydrogen permeating area.

(3) When using a palladium film as the hydrogen permeable film, the operating temperature range will be about 300 to about 500 degrees Celsius which coincides with the working temperature range of a high-temperature shift converter. This makes it possible to separate hydrogen without causing the palladium film to deteriorate.

(4) The installation of a high-temperature shift converter enables the working temperature of a reformer to be decided independently of the operating temperature of the palladium film, permitting the reformer to have a higher reforming rate.

(5) The hydrogen partial pressure in a reformed gas can be increased by producing hydrogen by using a high-temperature shift converter, thus permitting a higher hydrogen permeation rate of a palladium film.

(6) The configuration in which shift reaction chambers are disposed with a hydrogen gas chamber placed therebetween helps to make the apparatus compact, requiring a smaller space for installation.

(7) The hydrogen, which has been reformed by a reformer, is immediately separated into hydrogen gas chambers, permitting a simpler system configuration.

Although the invention has been described with reference to specific embodiments, this description is not meant to be construed in a limiting sense. Various modifications of the disclosed embodiments will become apparent to persons skilled in the art upon reference to the description of the invention. It is therefore contemplated that the appended claims will cover any modifications or embodiments as fall within the true scope of the invention.

What is claimed is:

1. A hydrogen manufacturing apparatus comprising:

a plate type high-temperature shift converter having a shift reaction chamber which is filled with a high-temperature shift catalyst and into which a reformed gas is introduced, a cooling chamber which is filled with a filler for promoting heat transfer and into which a cooling gas is introduced, and a partition for separating said shift reaction chamber and said cooling chamber;

wherein said plate type high-temperature shift converter comprises a plurality of partitions, shift reaction chambers, cooling chambers, and hydrogen gas chambers; two adjoining shift reaction chambers are disposed so that they are opposed to each other, the hydrogen gas chamber separated by a plate type partition being located therebetween; said partition is composed of a porous plate and a hydrogen permeable film which is coated or plated thereon and which allows only hydrogen gas to pass therethrough; so that only the hydrogen, which has been generated by subjecting a reformed gas to the shift reaction in the two adjoining shift reaction chambers, is allowed to pass through the hydrogen permeable film into a single hydrogen gas chamber.

2. A hydrogen manufacturing apparatus according claim 1 wherein said hydrogen permeable film is a palladium film.

* * * * *